(No Model.) 2 Sheets—Sheet 2.
T. L. & W. F. MAXWELL.
BIRD CAGE.

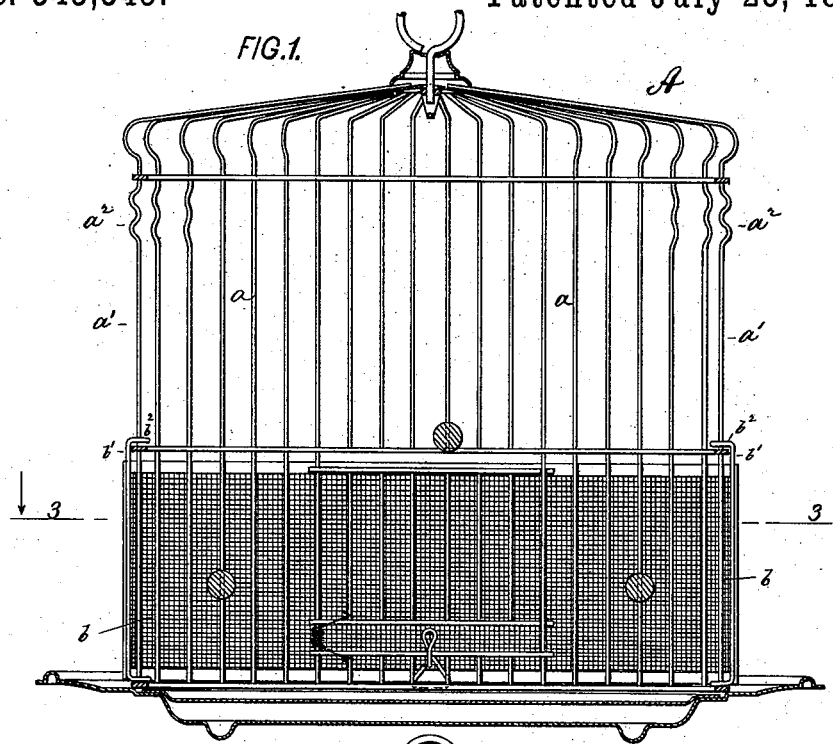
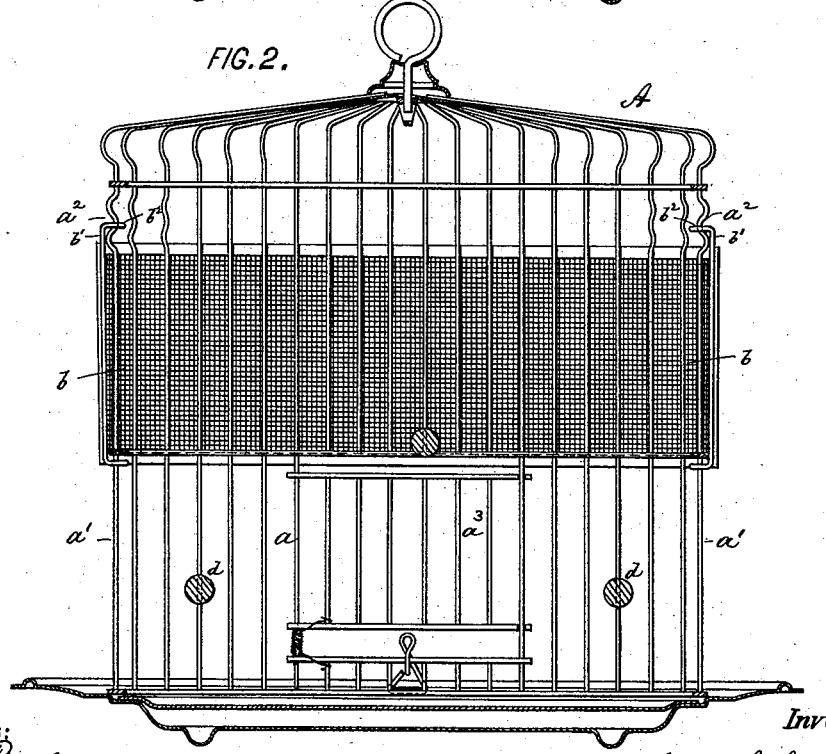

No. 543,345. Patented July 23, 1895.

Witnesses:
John Becker
Theodore Becker

Inventors:
Theodore L. Maxwell &
William F. Maxwell
by their attorneys
Roeder & Briesen

UNITED STATES PATENT OFFICE.

THEODORE L. MAXWELL, OF NEW YORK, AND WILLIAM F. MAXWELL, OF BROOKLYN, NEW YORK.

BIRD-CAGE.

SPECIFICATION forming part of Letters Patent No. 543,345, dated July 23, 1895.

Application filed April 4, 1895. Serial No. 544,393. (No model.)

*To all whom it may concern:*

Be it known that we, THEODORE L. MAXWELL, of New York city, and WILLIAM F. MAXWELL, of Brooklyn, New York, have invented an Improved Bird-Cage, of which the following is a specification.

This invention relates to an improved bird-cage, and more particularly to the novel construction of the fender that prevents the scattering of the food and gravel. Heretofore such fenders were either made entirely separate from the cage or they were immovably connected thereto. We propose to attach the fender movably to the wires of the cage, so that while normally held in place it may be readily shifted if access to the cage is to be gained.

Figure 3:
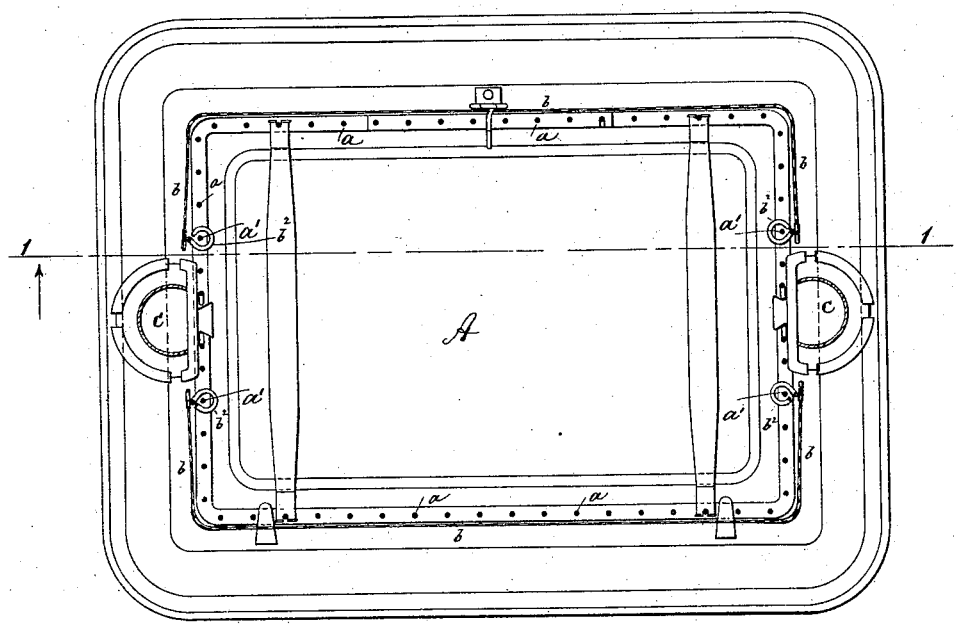

In the accompanying drawings, Figure 1 is a vertical section of our improved bird-cage on line 1 1, Fig. 3, showing the fender lowered. Fig. 2 is a similar section with the fender raised; Fig. 3, a horizontal section on line 3 3, Fig. 1; and Fig. 4 a horizontal section of part of a cage, showing a modification.

The letters $a$ represent the usual vertical wires of a bird-cage A, which may be crimped at the upper ends, as at $a^2$.

$b\ b$ are two fenders that extend along the sides of the cage and are bent around its corners, so as to reach preferably up to the feed-cups $c$. From the upper edge of these U-shaped fenders $b$ extend arms $b'$, that terminate in inwardly and horizontally projecting eyes $b^2$. Each of these eyes embraces one of the upright wires $a'$ of the cage. In this way a sliding connection between the fender and the cage is formed, which permits the fender to be freely slid up and down along the wires. When moved up, Fig. 2, it is retained in position by the engagement of the eyes $b^2$ with the crimps $a^2$, if the latter are used. In this position free access to the door $a^3$ and perches $d$ may be gained.

When the fender is moved down, Fig. 1, it is supported upon the bottom of the cage and prevents scattering of food and gravel.

The improvement may be applied to cages with or without doors, the latter being in fact unnecessary, as the fender itself closes the door-opening when lowered.

Figure 4:
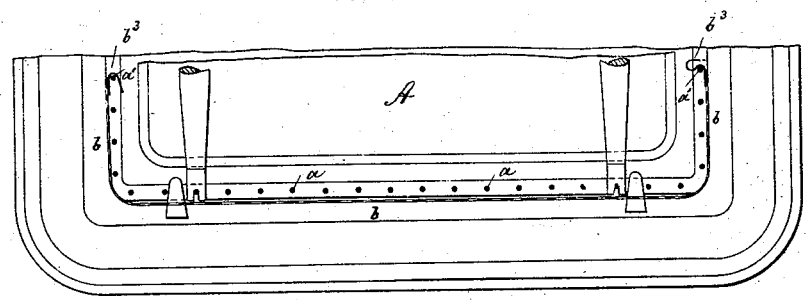

In Fig. 4 the fender $b$ is connected to the wires $a'$ by means of hooks $b^3$, that are bent around the wires $a'$ and replace the eyes $b^2$.

The advantages connected with our improved fender are that it may be readily operated, permits free access to the cage, and is always securely held in its proper position.

What we claim is—

A bird cage having wires that are crimped at their upper ends and a vertically movable fender engaging such wires and adapted to be suspended from the crimps when in its elevated position, substantially as specified.

THEODORE L. MAXWELL.
WILLIAM F. MAXWELL.

Witnesses:
WILLIAM SCHULZ,
F. V. BRIESEN.